March 10, 1970     OLE-BENDT RASMUSSEN     3,499,822
EXTRUDED, EXPANDED MAT-LIKE OR WEB-LIKE FIBRILLAR SHEET
ASSEMBLY AND METHOD FOR ITS PRODUCTION
Filed Feb. 21, 1966

Inventor
Ole-Bendt Rasmussen
By
Sol Shapiro
Attorney

United States Patent Office 3,499,822
Patented Mar. 10, 1970

3,499,822
EXTRUDED, EXPANDED MAT-LIKE OR WEB-LIKE FIBRILLAR SHEET ASSEMBLY AND METHOD FOR ITS PRODUCTION
Ole-Bendt Rasmussen, 28 Rugmarken, Farum, Denmark
Filed Feb. 21, 1966, Ser. No. 528,916
Claims priority, application Great Britain, Feb. 23, 1965, 7,870/65
Int. Cl. D04h 13/00
U.S. Cl. 161—169
11 Claims

ABSTRACT OF THE DISCLOSURE

An extruded sheet product having the form of an expanded mat- or web-like fibrous assembly and constituted by split fibers formed of elongated needle-like or thread-like formations, each having an average diameter of 0.5–10 microns, of a crystalline high molecular weight polymeric material A. The split fibers are interconnected by random branching of the crystalline formations into an integral network, the spaces intervening between the thread-like formations being partially filled by a second polymeric material B, chemically different from, incompatible with and having a lower melting point than material A, present in up to 40% of the aggregate weight of the two polymeric materials as a membrane-like covering on the crystalline formations.

Figure 1:
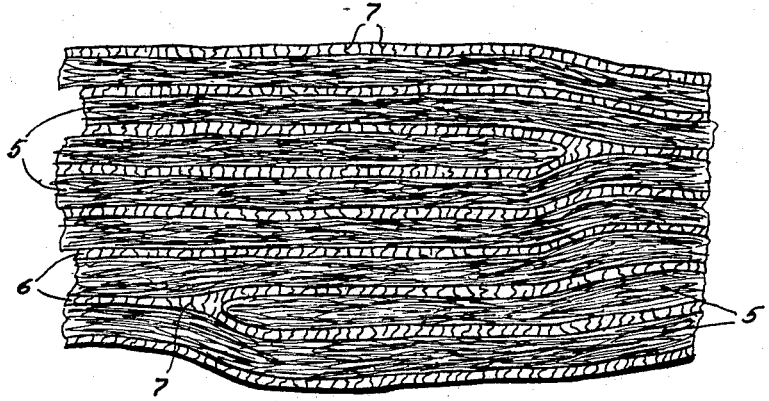

The product is obtained by colloidally dispersing in molten condition about 10–40% polymeric material B with about 90–60% polymeric material A, extruding the melt as a sheet to strongly stretch the dispersion interfaces in the extrusion direction while the polymers are still molten, cooling the extruded sheet below the crystallization temperature of material A to coagulate the same into elongated thread-like formations while maintaining material B in fluid state, thereafter allowing material B to solidify, swelling or partially leaching out material B, and stretching the sheet transversely of the extrusion direction to expand the sheet into a mat- or web-like fibrillar sheet structure.

---

This invention relates to a product in film or filament form and a fibrous product produced therefrom.

It is known that some polymers are per se easily splittable in an oriented state. Examples are polyvinyl chloride, post-chlorinated polyvinyl chloride, polyvinylidene chloride, polyvinyl alcohol, polystyrene, polyacrylonitrile, polyethylene and polypropylene.

It is hardly possible to give general indications of the possibility of obtaining this splittability after orienting, but in some cases it has been found possible, by means of microscopic examination in the unsplit state of an oriented high crystalline polymer which has been subjected to a heat-treatment, to notice that at some places in the material a structure has been formed of needleformed crystals with intervening membrane-like parts of non-crystalline material, said crystals following the direction of orientation. Both the crystalline and the non-crystalline material consist of the same polymer and accordingly the fissures or splits will occur haphazardly even as the fiber dimensions would be fortuitous, since much less force is required to widen an already formed split than to form a new split.

The preferred polymers for use in clothing are less crystalline, as for instance polyamides and polyesters, and they are relatively flexible. In polyamides also strong hydrogen bonds connect the molecules. Even after a strong orientation, therefore, it is difficult to split films or filaments of the said polymers, unless a loosening of the structure of the material is brought about in some way or other.

With this object in view, it is known to subject the material to treatment with a swelling agent, or to incorporate a foreign substance in a minutely comminuted form, which substance may be brought to expand or can be washed out, leaving cavities or cracks which may form starting points for a splitting.

In this manner fairly satisfactory results may be obtained also with not particularly well-splitting polymers, but also in this case the splitting occurs haphazardly unless the material has been homogenized very carefully.

It is further known to produce splitfibers from films, which have been produced from a mixture of a hydrophobic polymer and a hydrophilic or latently hydrophilic polymer, in order to improve the hydrophilic property of the fibers.

It is an object of the present invention to provide a product in film or filament form from a crystalline polymer or polymer mixture, said product being intended for subsequent splitting into fibers, and being of such character that it is possible in practically any case, in which the crystalline polymer is to be made into fibers, to govern the character of the fibrous structure and the fineness of the fibers over a broad range, as well as the surface character of the product, since by suitably composing the product it is possible to improve the splitting, to make it easier, and to decide where the splits are to occur.

With this object in view, a product of the invention is characterised in that its main component is a semi-crystalline to crystalline phase A of a polymer substance of high molecular weight, said A-phase being present in the product in substantially parallel, crystalline formations which are needle- to thread-shaped with an average diameter of 0.5–10µ, said crystalline formations being linked together across the intervening spaces by connections of colloidal dimensions of the same material, said intervening spaces being filled, in the nonfiberised state of the product, with another phase B consisting of a polymer or a polymer mixture, which is chemically different from A, said B-phase being wholly or partly absent in the fiberised form of the product, if desired.

For purposes of the invention, the B-phase material differs from the A-phase material primarily in having a lower melting point in order that the A-phase material will crystallize first when the extruded product is cooled and in being incompatible with the A-phase material in order that a miscible mixture does not result on mixing. Bearing in mind these essential differences, the selection of suitable combinations of the two polymer materials will not be difficult for the person skilled in this art. However, the following general guidelines will perhaps be of assistance in the making of such choices. If the A-phase material is so selected as to be highly crystalline in nature, such as isotactic polypropylene or polyformaldehyde, then the choice of the B-phase polymer is substantially less critical than if the A-phase material is of low crystallinity. In such a case, a wide variety of other polymer or polymer mixtures can serve as the B-phase, for example polyethylene, polyoxyethylene, polyvinyl esters, polyamides and co-polymers of these. For ease of mixing, the selection of a B-phase material fairly closely related chemically to the A-phase material will often be advantageous.

If the A-phase material is selected so as to be of intermediate crystallinity, that is of a crystallinity less than the highly crystalline materials just discussed but greater than semi-crystalline materials, best results are obtained by selecting a B-phase polymer which is less chemically related to the A-phase material. For example, where the A-phase is a polycaprolactam, the B-phase may advantageously be polyoxyethylene or an ionomer of ethylene and acrylic acid. It is also possible to use for the two phases polymers of the same general class, i.e. polyamides, where the B-phase polymer has the requisite lower melting point and incompatibility, such as would be the case in using poly-(11-aminoundecanoic acid) as the B-phase in combination with a polycaprolactam A-phase.

If the A-phase material is to be semi-crystalline, such as a co-polymer of caprolactam and hexamethylendiamine-adipic acid then the B-phase material should be as chemically foreign as possible, for example polyethylene or polyoxyethylene.

It should also be borne in mind that the conditions for manipulating the polymers in accordance with the invention can be varied rather widely, and it is almost always possible to discover particular conditions which will permit the production of the products of the invention virtually irrespective of the combination of polymers employed, provided, of course, the prerequisites identified at the beginning of this discussion are met.

Among such conditions are the crystallization tendency of the material. For example, if the B-phase is so chosen as to crystallize with difficulty or not at all, then the selection of the A-phase becomes much less critical. On the other hand, the B-phase can be so chosen as to crystallize at a different rate from that of the A-phase. The products of the invention can be particularly easily obtained where the B-phase is selected to have a substantially lower viscosity than the A-phase when the two are in the molten state at the same temperature.

In a preferred embodiment of the present product, the A-phase consists of isotactic or of syndiotactic polypropylene, of a polyvinyl compound, or of a highly crystalline polyethylene. The said polymers are cheap and easily available, and are consequently economic in use.

In another preferred embodiment of the present product, the A-phase consists of a polyamide or a polyester. By splitting such product, fibers are produced which are particularly suited for textile purposes. A further advantage is that polyamides and polyesters of a higher molecular weight than those, which can be used for fiber production by melt-spinning, can be used in the present product, giving better and more wear-resisting textile products.

In order to obtain fibers of high elasticity, the A-phase in a product according to the invention may consist of of a segmented polymer with alternating crystalline and elastomer segments, and in a preferred embodiment the crystalline segments consist of polypropylene or polyethylene, and the elastomer segments consist of a copolymer of propylene and ethylene.

The finest and most regular needle-like crystal formations are obtained according to the invention, if the melt-index of the A-phase is between 0.05 and 1.0 as determined according to ASTM No. D. 1238-57 T(E), but at a temperature 50° C. above the crystalline melting point of the polymer.

In a preferred embodiment of a product of this kind, the A-phase consists of isotactic or syndiotactic polypropylene, and the B-phase consists of an ethylene polymer or copolymer having a melt-index, determined at equal conditions, which is 5–200 times greater than that of the A-phase. The resulting products are cheap and easily splitable.

Extremely fine fiber dimensions may generally be obtained from products containing 60–80% by weight of the A-phase and 40–20% by weight of the B-phase, specifically with a view to wholly or partially removing the B-phase, before, during or after the fiberising process.

If greater importance is placed upon the tensile strength than upon fiber fineness, a product according to the invention appropriately contains 80–90% by weight of the A-phase and 20–10% by weight of the B-phase. The resulting product is suitable, for instance for fiberising to yield twine or yarn for making bags.

As is explained in the course of this description, one of the important steps in the process of the invention is a cooling of the extruded polymer mixture under conditions permitting the formation of the needle- to thread-like crystalline structures by the agglomeration or coagulation of the finely divided particles of the A-phase preferentially over the B-phase. It has been found that the development of such formations is particularly promoted by the selection of a B-phase which is either amorphous, or if crystalline, has a crystalline melting point much lower than that of the A-phase. If it is preferred, on the other hand, to promote the splittability of the products, then the B-phase material should be somwhat more crystalline and thus more brittle in character and more readily splittable.

For the production of fibers with a substantial surface friction, an embodiment of the present product is characterized in that the B-phase contains an ionomer.

When the intention is to wholly or partly remove the B-phase, it is preferable that the latter should consist of a water-soluble polymer, since water is the cheapest existing solvent. Preferably the B-phase then consists of polyoxyethylene, since this polymer is easily recovered from the aqueous solution because it precipitates when the solution is heated to about 90° C.

As suggested hereinbefore, the invention specifically aims at a product in fibrous form and in a preferred embodiment the product consists of thread-like crystal formations of the A-phase being linked together in a three-dimensional fiber-structure by means of intercrystalline connections of the phase A in colloidal dimensions. Starting from a film, a product of this kind gets a structure which in many respects resembles that of unsized paper, but is waterproof and, due to the intercrystalline connections, much stronger and more indestructible than unsized paper. It is also possible to manufacture the product in so bulky a form that it is suited for use as a heat-insulating, unwoven textile fabric.

In an embodiment of a fibrous product of the said kind, the thread-like crystal formations of the A-phase are wholly or partly surrounded by thin membranes of the B-phase. This makes is possible, no matter which polymer is chosen for the A-phase, to suitably choose the B-phase so as to give the fibers a desired surface character.

The present invention also comprises a method for the production of the said products, in which the A-phase and the B-phase are colloidally mixed, and an interface orientation of the melted mixture is carried out by strongly stretching the interfaces in the direction of movement of the melted mass when extruding the mixture in film or filament form, after which the A-phase is made to coagulate with crystal formation by cooling to below its crystalline melting point, the B-phase subsequently being solidified and in some cases crystallised, a final splitting of the resulting product into fibers being carried out, if desired.

During the melting and mixing, the character of the molten mass changes, possibly owing to the different viscosities of the phases, so that the particles of the A-phase are stretched to an elongated form, the phase eventually forming a spongy to gell-like structure with open pores, which are filled up by the B-phase. During the movement towards the extruder die or dies, and owing to the change in velocity when the product leaves the die or dies, a further stretching of the structural shape of the A-phase in the direction of movement takes place to give what is here called a phase orientation in melted state. This orientation can further be supported by stretching the film or filament immediately after leaving the dies and while still in melted state, just as the phase-orientation in the melted state can also be supported by using a long and narrow die for the extrusion.

When cooling the extruded product, the A-phase starts to coagulate and crystallise, and, owing to the phase orientation in the melted state, needle- to thread-like crystal formations are created, the interfaces between the A- and B-phases apparently supporting this form of crystal growth. At the same time a segregation takes place of particles of the B-phase being present in the crystallisation area, the segregated particles together with the rest of the B-phase forming pellicles or membranes surrounding the crystals of the A-phase. However, the said pellicles or membranes will contain parts or particles of the A-phase, which eventually crystallise to form interlinking connections between the said needle- to threadlike crystal formations.

By suitably choosing the polymers and the crystallisation conditions, the said method can be varied to suit the production of special split-fiber types and splitting methods.

Thus, cooling to coagulate the A-phase under crystal formation may be carried out, using a medium which is kept at a temperature a little below the crystalline melting point of the A-phase, to ensure that the A-phase gets sufficient time for crystal formation before solidification of the B-phase starts.

If the crystal formation is not so marked as desirable, this can be remedied if, after solidification of the two phases, the product is heated to a temperature above the recrystallisation temperature of the A-phase.

In another embodiment, the splitting into fibers is preceded by a molecular orientation by stretching the film or filament in the solid state to obtain easier splitting in a manner known per se.

A similar effect can be attained if the splitting into fibers is preceded by a swelling, or if a removal of the B-phase by washing is carried out.

However, in another embodiment of the present invention splitting into fibers is carried out by subjecting a film to a rolling transversely to the longitudinal direction of the thread-like crystal formations while the B-phase is still present, subsequently washing out the latter. The B-phase thus helps in separating the future fibers of the A-phase so that the resulting fibrous product gets a particularly bulky structure.

For further illustration of the invention in its various embodiments, a series of examples are given hereinafter. When melt-indexes are given, these have been determined as hereinbefore specified, and all percentages are by weight.

Example 1

This example illustrates the advantages of the invention as applied to the production of twine and similar coarse yarns by splitting of a film in which the A-phase consists of polypropylene.

For comparison purposes, a film was first produced from an unmixed isotatic polypropylene with melt-index 0.3, the width of the film being 5 cm. and the thickness 80$\mu$. The film was oriented by stretching at the optimal temperature for orienting, 130° C., and in the optimal stretching ratio of 9.7:1.

The tensile strength was 54 g./tex, the unit tex being the weight in grams of 1 kilometer of the film, and the value 54 g./tex indicating that a force corresponding to the weight of 54 kilometers of the film is necessary to break the film.

The oriented film was made into a split-fiber product by rubbing between surfaces of high frictional coefficient. By the rubbing, the band is rolled and twisted, and the film material is bent back and forth until splits occur.

The rubbing is continued until the film in the rolled and twisted state shows a flexibility similar to that of jute twine of the same titer. The tensile strength was now 35 g./tex. Then the rubbing was continued to a flexibility corresponding to that of cotton yarn, the tensile strength dropping to 10 g./tex.

Then a series of experiments were made using the same type of polypropylene as for the A-phase, varying amounts of low molecular weight, high density polyethylene (d.=0.96) of varying melt-index being admixed as the B-phase.

The reason why polyethylene was chosen as the B-phase was that this material is cheap, highly crystalline and rigid. The rigidity imparts a tendency for split creation when the molecular weight is comparatively low.

During extrusion of the mixture to a tubular film, the latter was stretched before solidification so that the thickness was reduced from 0.5 mm. to 80$\mu$, the diameter of the tube being kept constant. Simultaneously, the extruded film was moderately cooled by means of air-cooling in the same manner in all experiments. The subsequent stretching was carried out under the conditions, varying from mixture to mixture, which gave the optimal strength.

The highest tensile strengths were obtained by admixing about 15% of the polyethylene, and a film of this mixture, which was stretched at optimal conditions, viz. at 125° C. in the ratio 8.6:1, had a tensile strength of 53 g./tex before splitting, that is to say about the same as the film of unmixed polypropylene.

Then twines of varying flexibility were produced by rubbing as described above, and it was found that the tensile strength of the jute-like twine was 49 g./tex, and that of the cotton-like was 46 g./tex as compared with 35 and 10 g./tex for the corresponding twines made from unmixed polypropylene.

It also appeared from the experiments that the strength of the twines is reduced if the polyethylene contents are below the optimal one, probably because the splittability of the B-phase is then reduced, resulting in more of the fibers of the A-phase being torn in the splitting. On the other hand, if the polyethylene contents are substantially above the optimal one, the structure becomes so loose that the strength of the unsplit oriented material is substantially reduced.

It further appeared from the experiments that excellent results could be obtained in spite of the close relationship between the two phases, which is supposed to be due primarily to the pronounced ability of the polypropylene for crystal formation (90-95% crystallinity) and also to its property of segregating foreign substances. A condition for obtaining optimal results, is, however, that the polyethylene has a substantially higher melt-index than that of the polypropylene. If the melt-index of the polyethylene approaches that of the polypropylene too much, the tendency to form splits is greatly reduced, resulting in a reduction of the crystal formation in the polypropylene. An explanation of this seems to be that a higher melt-viscosity of the admixed B-phase restrains the coagulation of the A-phase, because the B-phase is then less mobile. As regards the tendency for split-formation, it is a known fact that polyethylene and other polymers become more resistant to cracking, the higher is the molecular weight.

Example 2

The experiments had the particular aim of improving twines and similar coarse yarns made from polypropylene in respect of bulk.

The same type of polypropylene was used as in Example 1, and as the B-phase was admixed 15% polyethylene of density 0.92 and a melt-index of 40, the latter proving optimal in a series of tests.

The tensile strengths of yarns with jute- and cotton-like flexibility were slightly smaller than in Example 1, viz. 46 and 40 g./tex, respectively.

The jute-like twine, consisting of a coarse network of split-fibers, was spread out to a very open-meshed state, and hot air at 110° C. was blown upon it to fix this state. After twisting, the yarn exhibited a remarkably stable bulk as compared with yarns produced in similar manner from the unmixed polypropylene and from the optimal mixture of polypropylene and polyethylene of density 0.96 described in Example 1.

The explanation probably is that the membrane material, i.e. the B-phase, substantially influences the deformation of the fibers, and that the lower melting point as well as the lesser crystallinity of the polyethylene of this example is more advantageous in this respect as compared with the polyethylene of Example 1.

Example 3

Again the object was to produce twine from polypropylene, but with the use of a B-phase selected for increasing the surface friction of the fibers.

For this purpose, the said B-phase consisted of a commonly available ionomer, which is a copolymer of ethylene and acrylic acid, in which some of the carboxyl groups have been neutralized by exchanging hydrogen with sodium. It is known that ionomers of this type have a high coefficient of friction, but will reduce the tendency for creating splits owing to the strong intermolecular bonds.

The ionomer had a melt-index of 10, and it was admixed in an amount of 15%.

The tensile strength of the resulting yarns was as in Example 2, but the coefficient of friction was substantially higher, because splitting takes place mainly in the B-phase, so that the latter forms a surface layer on the fibers.

The yarns could be made bulky in the manner described in Example 2, and with corresponding results.

Woven samples in the range from 100 g./m.$^2$ to 500 g./m.$^2$ were produced from a yarn weighing 300 mg. per m., the fibers in which were of cotton-like fineness. Corresponding samples were made from yarns produced according to Example 2, and the samples were tested as to the resistance against sliding apart upon piercing the samples. It was found that 100 g./m.$^2$ sample made according to the present example made the same resistance as a 250/m.$^2$ sample made according to Example 2.

Whereas the mixing of the phases, which is possible in a common extruder, was sufficient for the production of the films of Examples 1 and 2, the use of the above ionomer as the B-phase necessitated a more effective mixing. This was obtained by a preliminary mixing of the phases in an extruder of the planetary roller type, followed by extrusion under high pressure, up to 1000 kg./cm.$^2$, in another extruder, working on a principle similar to that of a gear wheel pump, and having a long, narrow die ending in a slot. Cooling of the extruded film took place on a roller, which was kept at a temperature slightly above the melting point of the ionomer, and was immediately followed by a stretching for molecular orienting of the polypropylene.

Example 4

This example will show how the principles of the invention can be adapted to the production of a new kind of paper-like material.

The A-phase consists of the same type of polypropylene as used in the previous examples, and the material for the B-phase was the same low density polyethylene of melt-index 40 as in Example 2, however in the admixture of 25% in order to obtain high fiber fineness. An oriented film was produced in the same manner as in Example 2, and the main part of the polyethylene was subsequently removed in a bath of xylene of 80° C. The hot xylene dissolved the polyethylene without substantially affecting the polypropylene at this temperature.

While still in the hot xylene bath, the film was drawn laterally to a 5–10 times greater width, thus producing a 3-dimensional flat network of fibers, in which the average width of the fine meshes was far below 1 mm., the product being of paperlike character in the dry state. The remaining polyethylene formed membranes surrounding the fibers and to some extent acted as a binder for the fibers at their points of contact. The surface character of the paper is very hydrophobic because of the polyethylene. This property makes the material useful for instance for surgical dressings which are in direct contact with the wound. Furthermore as both polymers are resistant to almost all chemicals at room temperature, the material is suitable for many filtering purposes.

The dissolved polyethylene can easily be precipitated by cooling of the solution and recovered by centrifuging.

Example 5

A paperlike material similar to that made in Example 4 but having a relatively hydrophilic surface character was produced, using the polypropylene of Example 1 as the A-phase, and an ethylene-vinylacetate-copolymer as the B-phase. The said copolymer was admixed in an amount of 25%, and consisted of 71% vinyl acetate and 29% ethylene and the melt-index was 20.

The same extrusion system as in Example 3 was used, the temperature of the cooling roller being about 130° C. The subsequent molecular orienting was carried out at the ratio 6:1, and the product was then treated for 5 minutes in a bath of xylene of room temperature. This treatment removed about 30% of the admixed copolymer. While still moist with xylene, the material was laterally stretched at the ratio 6:1 to form a homogeneous paperlike material. While the material was still wet and sticky from the xylene, it was cut into short lengths, and cross-laminated by means of a set of rubber rollers. No extra adhesive was necessary, as the swollen copolymer acted as an adhesive upon drying.

A microscopic examination of the unlaminated product in the dry state revealed that it consisted of a spaced network of interconnected fibers consisting of only one or a few thread-like crystals of a diameter of 2–3$\mu$, and a length between forking points of the fibers of less than 100$\mu$.

The weight of the unlaminated material was 21 g./m.$^2$, and the tensile strength in the direction, in which the material was strongest was 1.5 kg., and in the weakest direction 0.2 kg. per cm. width of the material. Upon cross-lamination, the tensile strength in all directions surpass the maximal value found for the unlaminated material. For comparison purposes, the tensile strength of a normal silk paper of 21 g./m.$^2$ is about 0.5 kg./cm.

The surface of the laminated material shows satisfying adhesion of normal ink and of printing ink, and the product is highly water resistant. Considering the low price of the raw materials, the product will be advantageous for use instead of paper for many purposes, such as for light wrapping paper, for book printing paper, and as air mail paper.

Example 6

If the procedure of Example 5 is followed, except that pentyl acetate at 90° C. is used instead of xylene, a product is obtained having a character very different from paper and being suitable for clothing purposes. The treatment with pentyl acetate results in about 95% of the admixed copolymer being dissolved. The splitting-up is again carried out in the moist state, the pentyl acetate acting as a kind of lubricant. The resulting product does not feel sticky when removed from the bath, and in dried state it is extremely soft and relatively bulky. The surface of the fibers are relatively hydrophilic, and are hairy in appearance.

The weight of the material was 21 g./m.$^2$, and the tensile strength in the strong direction was 1.9 kg./cm.,$^2$ and in the weak direction 0.1 kg./cm.$^2$ To obtain a fabric with sufficient strength in all directions the web was cut into short lengths which were placed on top of each other in a cross-wise arrangement and stitched or glued together.

The material, either in a single layer or laminated, will be suitable for instance for padding and for fabrics, such as underwear, robes, sport-shirts and light curtains.

Observations in an electron microscope proved that the spaces (membranes) between the thread-like crystal formations were bridged by fibrillar or flakelike cross-connections of far less cross sectional areas than the said crystal formations. These intercrystalline connections are of great importance for the cohesion of the material.

Example 7

The A-phase was again the same polypropylene as in Example 1, and the B-phase, which was added in an amount of 15%, was polyoxyethylene of melt-index 15. A yarn was produced by the procedure described in Example 3, the temperature of cooling rollers being kept at 130° C. After splitting-up to cotton-like fineness, the polyoxyethylene was washed out with 3 N aqueous hydrochloric acid with a small admixture of a detergent. The polyoxyethylene could also be washed out with water but it is more efficient to use an acid aqueous solution.

The resulting fiber product consists only of the A-phase, and the polyoxyethylene is easily recovered from the acid solution by neutralisation and salting-out.

In the same manner fibers can be produced from low density polyethylene of melt-index 0.05. This is an extremely high-molecular weight modification, and without admixture it is practically unsplittable.

Example 8

To improve the splittabality of an extrudable vinylidene-chloride-copolymer with melt-index 0.1, polyethylene of melt-index 20 is admixed in an amount of 15%, and the procedure of Example 3 is followed. After splitting, the polyethylene may be washed out, e.g. with xylene.

Example 9

To improve the splittability of polyformaldehyde with melt-index 0.5, there is admixed 20% of a copolymer between caprolactam and caprolactam-hexamethylene diamine in the ratio 60:40. The melt-index of the B-phase is about 70. The crystalline melting point of the polyformaldehyde is about 180° C., and for the copolymer 155° C. As both phases crystallize readily, the extruded film is kept at a temperature between 155° C. and 180° C. during crystallization.

The procedure is as in Example 3, except that the B-phase is swelled with ethyl alcohol before splitting.

This example has been chosen for illustrative reasons, since normally another B-phase would be chosen, for instance polyoxyethylene having a melting point about 70° C.

Example 10

This example illustrates the production of a yarn from polycaprolactam of a very high molecular weight, corresponding to melt-index 0.4. As far as known neither normal melt-spinning nor the known splitfiber procedures can be applied for producing fibers of about 1 denier or lower from material of such high melt viscosity and high molecular weight.

The reason why known splitfiber technique is insufficient is the toughness caused by the strong intermolecular hydrogen bonds and the relatively flexible character (modulus of elasticity 25–30 g./denier as compared with 105 g./denier for polypropylene) and finally the high molecular weight. On the other hand this material is very useful, primarily because of high abrasion resistance.

The B-phase was the same polyethylene as used in Example 2, and the procedure followed that of Example 3, except that the temperature of the cooling roller was 180° C. It was necessary to use a higher admixture of the B-phase, 30% proving most suitable. After splitting, the polyethylene was removed by means of hot xylene.

The same procedure has successfully been applied to polyethylene terephthalate of similar melt-index. This polymer is very tough almost like the polyamide, and thus present almost the same problems in splitting.

Example 11

A non-woven fabric of a structure similar to that of Example 6 was produced from the polycaprolactam of Example 10 and, as the membrane-forming B-phase, 35% of the polyoxyethylene of Example 7, were admixed. The film-forming process was carried out as in Example 10.

Owing to the strong intercrystalline connections, it was not possible to produce a homogeneous fibrous structure by the simple lateral drawing described in Examples 4–6.

Instead a homogeneous drawing-out was carried out by means of lateral rolling, but the resulting fiber product had the character of a paper without any bulk effect.

A product of a similar bulky structure as that of Example 6 was obtained by rolling to produce a stretching ratio of 5:1 before washing out the B-phase.

Corresponding results could be obtained, using a polyester instead of the polyamide.

The polyoxyethylene is very suitable for the B-phase, not only because of the easy removal and reclaiming, but also because of a rather waxy consistency which easily can be squeezed out during the crystallisation of the A-phase.

Example 12

Polyethylene terephthalate of melt-index 0.5 was used as the A-phase, and 30% of the copolymer of Example 9 was admixed as the B-phase. After production and orienting of the film, the B-phase was strongly swollen and partly dissolved by means of ethanol. The fibers produced by the splitting have a relatively hydrophilic cover of the co-polymer.

Example 13

The industrial development of textile fibers seems to tend against semicrystalline materials which are softer than polycaprolactam and polyethylene terephthalate, and have a substantially lower modulus of elasticity, but which still have high melting points.

These features are present in block-copolymers which consist of segments having a high crystalline melting point alternating with elastomer segments. Examples of this kind of co-polymers are the condensates either between polyesters and macroglycols, between polyamides and macroglycols, or between isocyanates and macroglycols.

It has been impossible to split such soft semicrystalline copolymers by the known splitfiber methods, but upon admixture of a B-phase after the principles of the invention, such splitting has been made possible.

For example, a block-copolymer having segments of polyethylene terephthalate alternating with segments of a macroglycol has been split by admixing polyethylene as the B-phase. The ratio between macroglycol and polyester in the copolymer was 40:60 and the melt-index of the latter was 0.5. 35% of the same polyoxyethylene as in Example 7 were admixed.

Example 14

As an example of a polyolefinic block-copolymer of similar principal structure as that in Example 13, a polymer was tried which was formed by sequential addition polymerisation, produced by sequence of (1) unmixed propylene to form crystalline segments and (2) propylene mixed with ethylene to form elastomer segments. The degree of crystallinity of the copolymer was about 55%, and the melt-index about 1. As the B-phase, 25% of the polyoxyethylene of Example 7 was admixed. A readily splitable structure of needle- to thread-like crystal formations was obtained. The aim of trying this particular polymer was to modify cheap technical polypropylene yarn towards higher elastic elongation in order to improve the knot and shock strengths.

Figure 2:
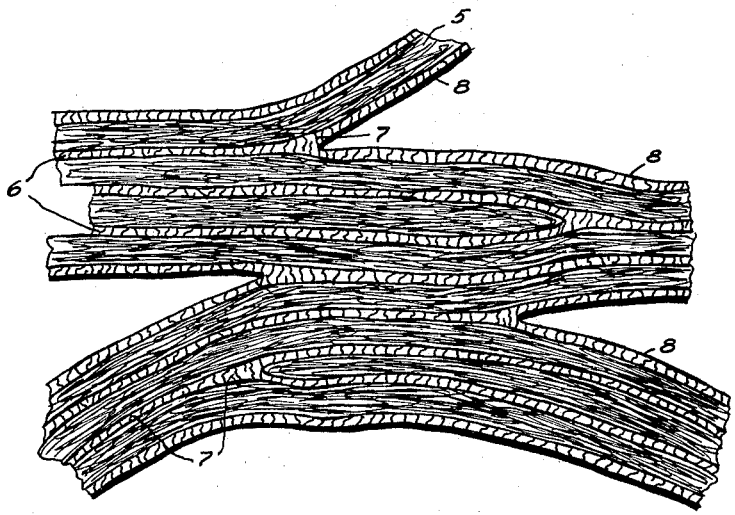

The products of the invention are illustrated in the accompanying drawing, where:

FIG. 1 is a sectional view of the unsplit product on a greatly enlarged scale, and FIG. 2 is a corresponding view of the split product.

In FIG. 1, 5 denotes the thread-like crystal-formations of the A-phase polymer, which are separated by thin membranes 6 of the B-phase polymer. It will be noted that the crystal formations 5, the actual diameter of which is usually 2–3μ, are linked together by numerous much finer connections 7 crossing through the membranes 6. The connections 7 also consist of the A-phase polymer, and their diameter is judged to be about 100 angstroms.

FIG. 2 shows that the product splits in the membranes 6, and that the resulting fibers 8 consist of a single or a few of the crystal formations 5.

I claim:

1. An extruded fibrous sheet product comprising a high molecular weight polymeric material, A, in the form of an integral network of interconnected split fibers consisting of distinct needle-like or thread-like crystalline formations having an average diameter of 0.5 to 10 microns, said formations being randomly forked at spaced points along their length and being interconnected through such forks with other of such split fibers to form an expanded mat or web-like sheet assembly; a second polymeric material B present in up to about 40% of the aggregate weight of materials A and B and distributed through the sheet assembly in the form of membrane-like coverings on said crystalline formations, said material B being incompatible with and having a lower melting point than said material A.

2. A sheet product according to claim 1, in which the polymeric material A is a polyamide or a polyester.

3. A sheet product according to claim 1, in which the melt index of the polymeric material A is between 0.05 and 1.0 as determined according to ASTM. No. D1238–57T(E) at a temperature 50° C. above the crystalline melting point of said polymer.

4. A sheet product according to claim 1, in which the polymeric material A consists of isotactic or syndiotactic polypropylene, an isotactic or syndiotactic polyvinyl compound or highly crystalline polyethylene.

5. A sheet product according to claim 1, in which the polymeric material B is polyethylene.

6. A sheet product according to claim 1, in which the polymeric material B is water-soluble.

7. A sheet product according to claim 6, in which the polymeric material B is polyoxyethylene.

8. A sheet product according to claim 1, in which the polymeric material A is a polyamide or a polyester and the polymeric material B is polyoxyethylene.

9. A sheet product according to claim 1, in which the polymeric material A consists of a block co-polymer with alternating crystalline and elastomeric segments.

10. A sheet product according to claim 9, in which the crystalline segments consist of polypropylene or polyethylene and the elastomeric segments consist of a co-polymer of propylene and ethylene.

11. A sheet product according to claim 1, in which the polymeric material A consists of iso- or syndiotactic polypropylene and the polymeric material B consists of an ethylene polymer or co-polymer having a melt index, determined at equal conditions, which is 5–200 times greater than that of the polymeric material A.

References Cited

UNITED STATES PATENTS

| | | | |
|---|---|---|---|
| 3,092,891 | 6/1963 | Baratti | 260—897 |
| 3,097,991 | 7/1963 | Miller | 260—897 |
| 3,173,163 | 3/1965 | Cramton | 15—159 |
| 3,322,854 | 5/1967 | Yasui | 260—857 |
| 3,330,899 | 7/1967 | Fukushima | 260—857 |
| 3,382,305 | 5/1968 | Breen | 264—171 |

FOREIGN PATENTS

| | | |
|---|---|---|
| 930,074 | 7/1963 | Great Britain. |
| 982,114 | 2/1965 | Great Britain. |
| 665,067 | 6/1963 | Canada. |
| 1,415,396 | 9/1965 | France. |
| 39/6355 | 4/1964 | Japan. |

ROBERT F. BURNETT, Primary Examiner

LINDA M. CARLIN, Assistant Examiner

U.S. Cl. X.R.

260—857, 873, 897, 901; 264—210